US 6,914,366 B2

United States Patent
Kaga et al.

(10) Patent No.: US 6,914,366 B2
(45) Date of Patent: Jul. 5, 2005

(54) APPARATUS FOR SUPPRESSING VIBRATION OF OPTICAL PART

(75) Inventors: Takashi Kaga, Ibaraki (JP); Naohisa Kumagai, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 242 days.

(21) Appl. No.: 10/231,276

(22) Filed: Aug. 30, 2002

(65) Prior Publication Data

US 2003/0042822 A1 Mar. 6, 2003

(30) Foreign Application Priority Data

Sep. 3, 2001 (JP) ........................................ 2001-266393

(51) Int. Cl.[7] .......................... H02N 2/12; H02N 2/14; G02B 26/08; G02B 26/10
(52) U.S. Cl. ...................... 310/339; 310/317; 310/318; 310/319; 359/213; 359/214; 359/212
(58) Field of Search ................................ 310/317–319, 310/338, 339; 359/212–214

(56) References Cited

U.S. PATENT DOCUMENTS

| 4,795,123 | A | * | 1/1989 | Forward et al. | ............. 248/550 |
| 4,849,668 | A | * | 7/1989 | Crawley et al. | ............. 310/328 |
| 5,032,753 | A | * | 7/1991 | Yamaguchi et al. | ........ 310/317 |
| 5,054,866 | A | * | 10/1991 | Tomita et al. | .............. 359/201 |
| 5,079,641 | A | * | 1/1992 | Marino et al. | .............. 359/224 |
| 5,276,545 | A | * | 1/1994 | Daun et al. | .................. 359/198 |
| 5,378,974 | A | * | 1/1995 | Griffin | ......................... 318/649 |
| 5,532,480 | A | * | 7/1996 | Scofield | ...................... 250/235 |
| 5,640,263 | A |   | 6/1997 | Sonoda | ........................ 359/196 |
| 6,252,334 | B1 | * | 6/2001 | Nye et al. | .................... 310/328 |
| 6,486,589 | B1 | * | 11/2002 | Dujari et al. | ............... 310/331 |

FOREIGN PATENT DOCUMENTS

| GB | 2343494 | A | * | 10/2000 | ............ F16F/15/02 |
| JP | 5-88097 |   |   | 4/1993 | ............ G02B/26/10 |
| JP | 8-106129 |   |   | 4/1996 | ............ G03B/27/50 |

* cited by examiner

Primary Examiner—Thomas M. Dougherty
(74) Attorney, Agent, or Firm—Fitzpatrick, Cella, Harper & Scinto

(57) ABSTRACT

In the exposing apparatus of an image forming apparatus or the like, an apparatus for suppressing the vibration of an optical part has a detector for detecting the vibrating state of the optical part, and a controller for controlling a vibrator so as to give the optical part such an appropriate amount of vibration as will negate the vibration of the optical part. Thereby, it becomes unnecessary to excessively increase the rigidity of the optical part and thus, a decrease in weight can be achieved.

14 Claims, 6 Drawing Sheets

— MIRROR VIBRATION
····· PIEZOELECTRIC ELEMENT VIBRATION

APPARATUS FOR SUPPRESSING VIBRATION OF OPTICAL PART

BACKGROUND OF THE INVENTION

1. Field of the Invention

This invention relates to an apparatus for suppressing the vibration of an optical part used in the exposing apparatus of an image reader or an image forming apparatus.

2. Description of Related Art

FIG. 6A of the accompanying drawings shows a cross-sectional view of an image reader.

As a method of reading an image, in the recent digital copying machine, an original image inputted from an optical scanning system comprised of a mirror or the like is converted into an electrical signal by a reading element 150 comprising a charge coupled device (CCD), and image data is sent to an image forming apparatus.

The data sent to the image forming apparatus schematically shown in FIG. 6B of the accompanying drawings becomes a laser beam applied from a semiconductor laser source to a rotary polygon mirror 151 as a laser and forming image data in the main scanning direction, and this laser beam is reflected by a turnback mirror 153 via an imaging lens, and the surface of a photosensitive drum 154 is exposed to the laser beam, whereby a latent image is formed thereon.

By such a process, image data is formed on the surface of the photosensitive drum1 154, but in an image reading apparatus, an optical system generically named a mirror table and an optical mirror are scanned in the sub-scanning direction to read the original image.

The optical mirror in the image reading apparatus is comprised of three mirrors called a first mirror 145, a second mirror 147 and a third mirror 148, the first mirror 145 being installed on a first mirror table 144, and the second mirror 147 and the third mirror 148 comprising two optical scanning systems installed on a second mirror table 146.

Also, the second mirror table 146 is moved at 1:2 relative to the amount of movement of the first mirror table 144 to keep the optical path length constant, but at this time, the optical mirror itself has its opposite ends fixed to the first mirror table 144 and the second mirror table 146 by leaf springs and thus, the mirror is in a state in which the opposite ends thereof are supported, and tends to scan chiefly in an outward direction relative to the reflecting surface of the mirror by an inertial force due to scanning or the vibration of a driving motor or a driving belt or the like for driving the optical scanning systems while maintaining a vibrating state called a bending mode.

Thereby the optical axis is read while being shaken relative to the main scanning direction of the surface of the CCD 150, thus causing the bad quality of image attributable thereto.

Also, in the image forming apparatus, the turnback mirror 153 is vibrated by the rotational vibration of the rotary polygon mirror 151 or disturbing vibration or the like transmitted from other place, and the laser beam applied from the rotary polygon mirror 151 to the turnback mirror 153 causes the surface of the photosensitive drum 154 to be exposed thereto while causing the bad quality of image called "uneven pitch" on the surface of the photosensitive drum 154 by the vibration of the turnback mirror 153, thereby forming a latent image.

Such an image reading apparatus and such an image forming apparatus need be made higher and higher in the image reading speed and the image forming speed for the higher speed in recent years, and in order to meet the requirement for the higher accuracy of image, it has become necessary to reduce the vibration of the optical axis, that is, to minimize the amount of vibration of the mirror.

Heretofore, in order to meet such a requirement, it has often been practiced to stick an anti-vibration member such as a metal plate directly on the mirror, or to adopt a countermeasure for vibration as by changing the method of fixing the mirror, and the technique disclosed in Japanese Patent Application Laid-Open No. 8-106129 proposes to stick a reinforcing member on the back side of the mirror to thereby obtain a vibration suppressing effect, and the technique disclosed in Japanese Patent Application Laid-Open No. 5-88097 proposes an optical axis detecting method in an image forming apparatus and exposure position control by mirror reflection angle control.

In the case of the above-described prior art, however, the following problems have arisen.

When as in the technique disclosed in Japanese Patent Application Laid-Open No. 8-106129, an attempt is made to obtain the vibration suppressing effect by glass or the like in the mirror surface, planarity relative to the mirror surface can be secured to some extent, but the unstable behavior of the optical scanning system by a change in the centroidal position of the mirror table itself, and the fluctuation of motor torque during the optical scanning in the image reading apparatus by the addition of mass may be caused by the mass of the mirror.

Also, as one of the vibration suppressing effects by the sticking of an anti-vibration member such as a reinforcing member, it is intended in almost all cases to let the natural vibration of the mirror itself by increasing the rigidity of the mirror escape the high frequency side and avoid the resonance with the driving frequency of the mirror table or the optical motor and thus, the reinforcement of the rigidity of the mirror is necessarily effected on the mirror in a wide range. Therefore, the mass as the anti-vibration member becomes great and at the same time, when this anti-vibration member is a metal plate or the like, the planarity of the mirror may be remarkably spoiled and at the same time, these countermeasures for vibration are often effective only for respective objects and are short of universality for many types of machines.

Also, it may result in the complication of structure by the installation or the like of a mirror rotary mechanism and lead to an increase in cost to supplement the beam reflected during the observation of the positional deviation of the optical axis as in the technique disclosed in Japanese Patent Application Laid-Open No. 5-88097.

Moreover, the control of the irradiating position is done by rotating the mirror, and this is not effective for the bending vibration of the mirror which occurs frequently in the optical scanning system.

SUMMARY OF THE INVENTION

It is an object of the present invention to provide an apparatus which can suppress the vibration of an optical part.

It is another object of the present invention to provide a vibration suppressing apparatus which can apply vibration for negating the vibration of an optical part.

It is still another object of the present invention to provide a vibration suppressing apparatus comprising:

an optical part;

detecting means for detecting the vibrating state of the optical part;

vibrating means for applying vibration to the optical part; and control means for controlling the vibrating state applied to the optical part by the vibrating means on the basis of the output of the detecting means.

Further objects of the present invention will become apparent from the following description.

DETAILED DESCRIPTION OF THE PREFERRED EMBODIMENTS

A preferred embodiment of the present invention will hereinafter be described in detail by way of example with reference to the drawings. However, the dimensions, materials, shapes, relative dispositions, etc. of constituent parts described in this embodiment are not intended to restric the scope of this invention thereto unless otherwise specified.

The present embodiment is such that an optical mirror 2 as the vibrating region of an optical system is provided with a piezoelectric element 1 which makes vibration controllable.

In order to control the piezoelectric element 1, provision is made of a sensor 3 and a detecting part 7 as vibrating state detecting means for detecting the vibrating state of the optical system as an analog signal, and a feedback control system for controlling the vibration of the piezoelectric element 1 on the basis of the vibrating state.

Figure 1A:
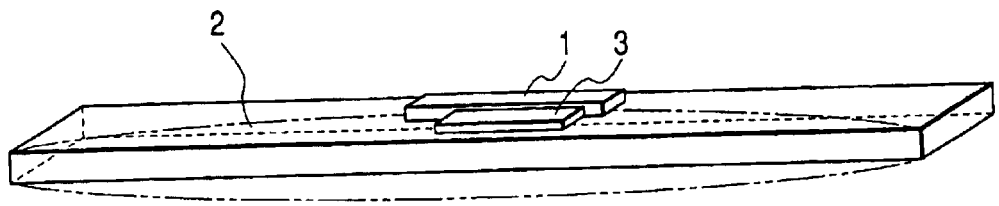
FIG. 1A illustrates the principle of an optical system vibration controlling apparatus according to an embodiment of the present invention.
Figure 1B:
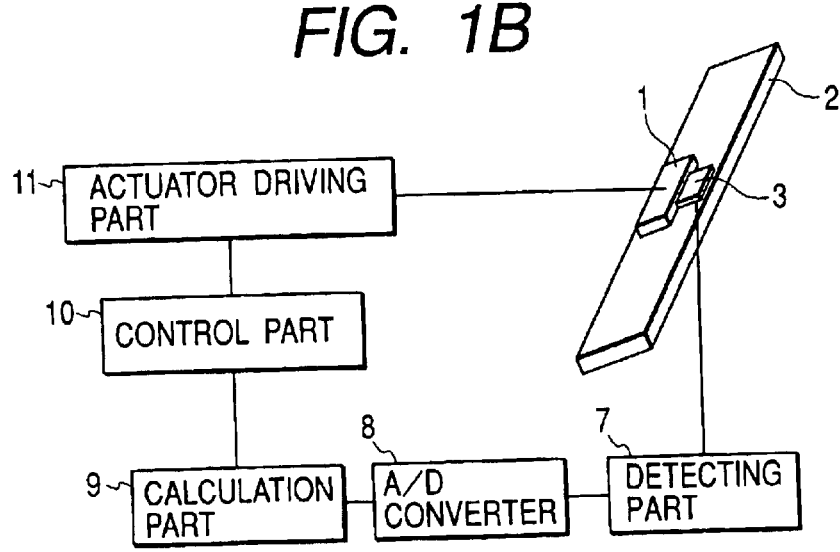
FIG. 1B is a control block diagram of the apparatus of FIG. 1A.

The feedback control system, as shown in FIG. 1B, may preferably be provided with a calculation part 9 for calculating the vibration frequency and the amount of amplitude of the optical mirror 2 on the basis of detection information from the detecting part 7, and a control part 10 for giving a feedback gain from data obtained by the calculation part 9 to an actuator driving part 11 for driving the piezoelectric element 1 so as to assume a predetermined amplitude value. The analog signal from the detecting part 7 is converted into a digital signal through an A/D converter 8 and is inputted to the calculation part 9.

The optical mirror 2 is applied to the optical system of an image reading apparatus or an image forming apparatus, and has its opposite ends supported by mirror supporting portions, not shown, and curvedly vibrates outwardly relative to the optical surface thereof, as shown in FIG. 1A.

The piezoelectric element 1 used as an actuator is an element utilizing such characteristics as the positive piezoelectric effect producing a voltage by pressure being applied thereto and the reverse piezoelectric effect of being deformed when a voltage is applied thereto, and is highly effective for the control of minute vibration like that of the optical mirror 2. The piezoelectric element 1 is stuck on a side of the optical mirror 2, and can curvedly deform the optical mirror 2 by the expansion and contraction of the piezoelectric element 1. The stuck position of the piezoelectric element 1 may be any of the front side and the back side of the optical mirror 2 if it does not affect the optical path thereof.

As the piezoelectric element 1, use is made, for example, a piezoelectric element 1 called piezoelectric film (polyvinylidene fluoride : PVDF). This piezoelectric film permits thicknesses from the order of several μm and can be freely formed into various shapes and can therefore achieve light weight and thinness as well as a small size, and even if stuck on a mirror, will not so bring the planarity thereof out of order as when stuck on a metal plate.

As regards a method of joining the piezoelectric element 1 and the optical mirror 2 together, the joining by an adhesive material would occur to mind, but a double-side tape is also possible, and the joined position need not be the center of the mirror, but may be any position if the vibration suppressing performance is satisfied.

Also, the sensor 3 for observing the vibrating state of the optical mirror 2 may be any of an acceleration sensor, a displacement sensor, a strain gauge and the like which can detect the vibrating state, but a method of detecting the vibration of the mirror as a voltage from a piezoelectric element by the utilization of the positive piezoelectric effect of the piezoelectric element is also possible. This sensor 3 for vibration detection is also stuck on the optical mirror 2. The stuck position of this sensor may be any one of the front side and the back side of the optical mirror 2 if it enables the vibrating state to be accurately detected and does not affect the optical path.

As regards also the control part 10, it is possible to endow it with universality which enables it to be evolved to multiple types of machines differing in driving sequence and motor vibration from one another as long as an optical mirror 2 of the same shape is used, by designing a control algorism having robustness which will enable it to follow a predetermined target value even if disturbance is applied to the optical mirror 2 to some extent.

Also, when a double-side tape is used as he aforedescribed joining method, it is possible to avoid in design one of which he viscosity and attenuation are difficult to evaluate and of which the unevenness of the adhesiveness is feared.

The operation of the above-described optical system vibration controlling apparatus will now be described.

First, the piezoelectric element 1 is stuck on the optical mirror 2, and the vibrating state of the optical mirror 2 is observed by the sensor 3 such as an acceleration sensor which can catch vibration, and this amount of vibration is caught as a voltage by the detecting part 7. This voltage is inputted in the form of an analog waveform and therefore is not suited for the signal processing by a computer. Consequently, it is digitized and made into a digital signal by the A/D converter 8.

The vibration information made into a digital signal gives a feedback gain to the actuator driving part 11 in accordance with a control algorism programmed so that the amount of amplitude of the optical mirror 2 may be calculated by the calculation part 9 and it may become a predetermined mirror amplitude value by the control part 10.

The piezoelectric element 1 stuck on the optical mirror 2 receives from the actuator driving part 11 a driving signal given this feedback gain.

Figure 1C:
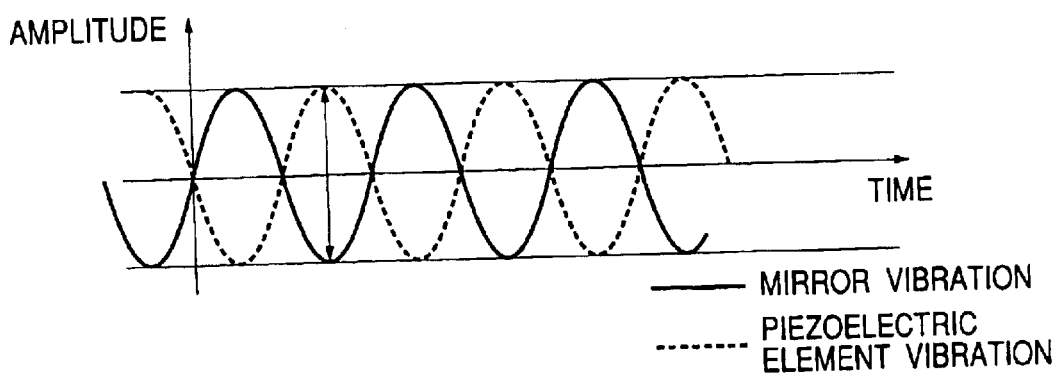
FIG. 1C is a graph showing the vibrating states of the opposite phases of an optical system and a piezoelectric element.
Figure 2A:
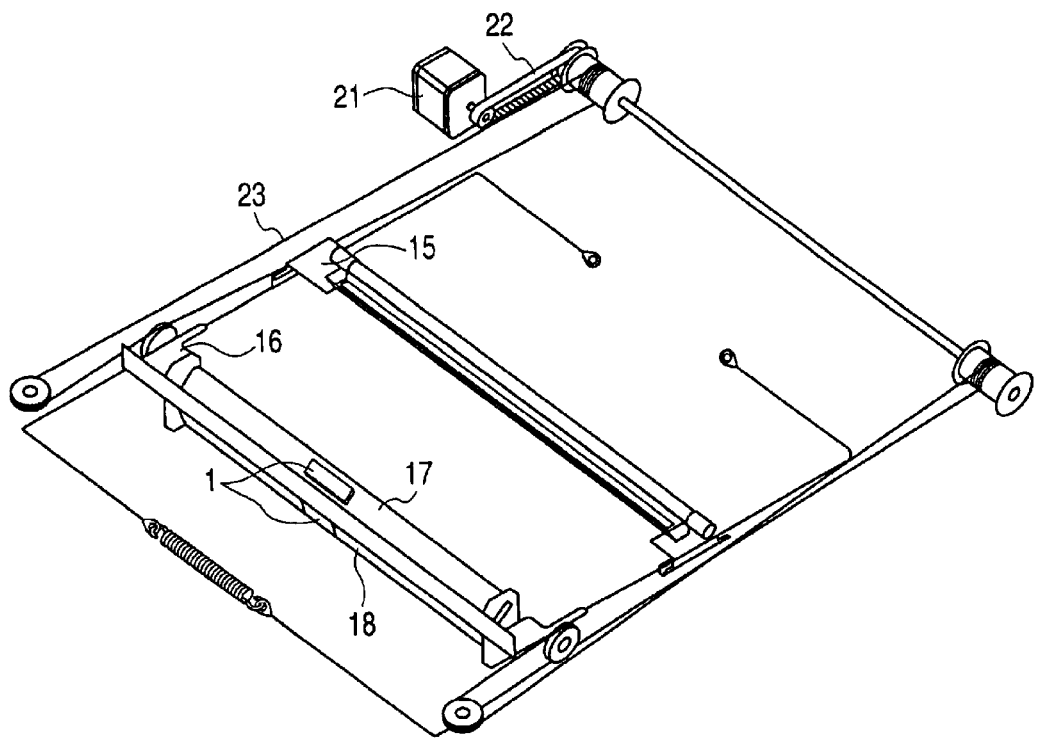
FIGS. 2A and 2B show an image reading apparatus to which the optical system vibration controlling apparatus of FIGS. 1A, 1B and 1C is applied, FIG. 2A being a perspective view, and FIG. 2B being a cross-sectional construction view.
Figure 2B:
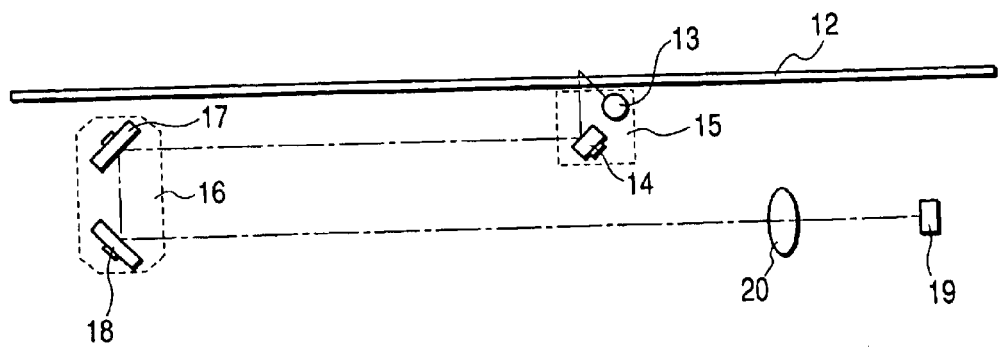

As a result, the amplitude of the piezoelectric element 1 obtained by the piezoelectric effect is given as an opposite phase, and as shown in FIG. 1C, the opposite phase to the mirror vibration is offset by the vibration of the piezoelectric element 1, and the amplitude of the combined wave thereof is reduced. Again the vibrating state is observed by the sensor 3, and the aforedescribed operation is repeated.

Thus, by constructing a closed loop system as shown in FIG. 1B, the amount of vibration of the mirror can be reduced to a predetermined amplitude value.

A popular vibration suppressing technique, however, is poor in universality for multiple types of machines and disturbance vibration transmitted from other factor is often multiplied, and there is no problem when these factors are not feared at all, but if not so, even in an apparatus which has a certain extent of disturbance in the control part 10 and somewhat differs in specification, the problems of the disturbance vibration and the universality for multiple types of machines can be solved by designing a control algorism given robustness which enables it to follow a predetermined target value.

Some embodiments of the present invention will now be described specifically. The following embodiments are examples in which the optical system vibration controlling apparatus of the above-described embodiment is applied to a specific image reading apparatus and a specific image forming apparatus, and the construction itself of the optical system vibration controlling apparatus is the same as that of the above-described embodiment, and the same constituent portions are given the same reference numerals and need not be described.

(First Embodiment)

FIGS. 2A, 2B, 3A and 3B show a first embodiment. This first embodiment is one in which the above-described optical system vibration controlling apparatus is applied to the optical system of an image reading apparatus.

That is, the optical system of this image reading apparatus has the function of causing an exposing optical system to scan relative copy board glass 12 on which an original is placed to thereby read the image of the original. The exposing optical system has a first mirror table 15 and a second mirror table 16 for scanning relative to the copy board glass 12. The first mirror table 15 is provided with an exposure lamp 13, a reflecting troffer, not shown, for causing light applied thereto by the exposure lamp 13 to be transmitted therethrough and condensed on the surface of the original, and a first mirror 14 just beneath it on which the optical image of the original reflected by the surface of this original is incident.

This first mirror 14 has its reflecting surface installed at 45° in a direction opposite to the sub-scanning direction, and the optical axis of the image of the original reflected by the surface of this mirror is reflected toward the second mirror table 16 located rearwardly of the first mirror table 15.

On the other hand, the second mirror table 16 is provided with a second mirror 17 and a third mirror 18, and the optical axis of the image of the original reflected from the first mirror is turned back toward a CCD 19 as a reading element.

This second mirror table 16 is designed to keep the length of the optical path from the first mirror table 15 onto the surface of the CCD 19 constant and therefore, the amount of movement of the second mirror table 16 is always kept at 1:2 relative to the amount of movement of the first mirror table 15.

The optical axis of the image turned back to the second mirror 17 and the third mirror 18 and applied in the sub-scanning direction of the first mirror table 15 enters the CCD 19 through an imaging lens 20 and is taken in as image data.

Figure 3A:
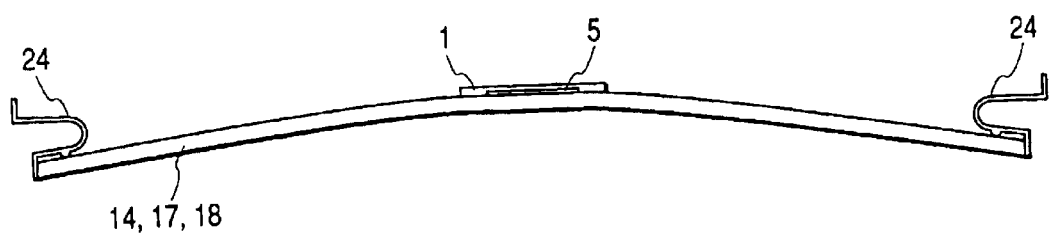
FIG. 3A shows the supported state of the optical mirror of FIGS. 2A, 2B, and 3B is an enlarged view of the mirror supporting portion of FIG. 3A.
Figure 3B:
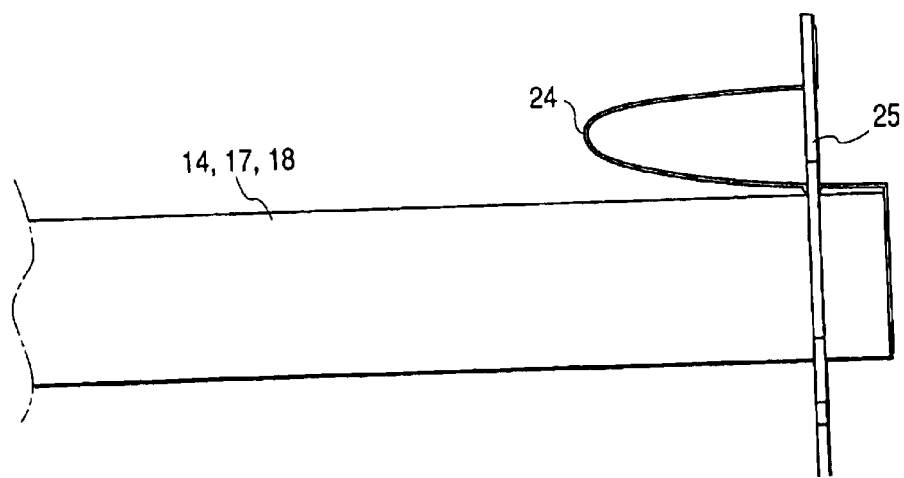

The first mirror 14, the second mirror 17 and the third mirror 18, as shown in FIGS. 3A and 3B, have their opposite ends supported on the mirror supporting plate 25 of the apparatus through mirror supporting springs 24, and the central portions thereof are in their free state.

An optical scanning system is slidingly moved on the surface of an optical rail with a driving motor 21 as a drive source and with a driving belt 22 and a driving wire 23 as the motive power transmitting medium thereof, but in the image reading apparatus, this driving motor 21 becomes a vibration generating source, and due to this vibration and the inertial force by optical scanning, the first optical mirror 14, the second optical mirror 17 and the third optical mirror 18 are curvedly vibrated outwardly relative to the optical surface, as shown in FIG. 3A. So, the optical vibration controlling apparatus described in the above-described embodiment is applied to these mirrors.

The vibration suppressing method of the present embodiment will herein after be described.

The piezoelectric element 1 is attached and fixed to the back side of each of the first mirror 14, the second mirror 17 and the third mirror 18.

At this time, it is necessary that the flatness defined by the optical mirrors 14, 17 and 18 not be spoiled by the plurality of the piezoelectric elements 1 and therefore, it is desired to utilize as light-weight and this piezoelectric elements 1 as possible typified by piezoelectric film or the like.

A vibration detecting sensor 5 is installed on the back sides of the optical mirrors 14, 17 and 18 so as not to affect the optical path thereof.

It is desired that this sensor 5 be also attached and fixed to the optical mirrors, and if the sensor 5 is not attached and fixed, the vibrating state of the optical mirrors 14, 17 and 18 becomes incapable of being accurately detected and the further aggravation of the vibration, i.e., the diffusion of the vibration, of the optical mirror 14, 17 and 18 due to a wrong gain being returned from a control system to the piezoelectric elements 1 may be caused.

Also, as regards the vibration source, besides the vibration by the driving motor 21, the driving belt 22 and the mirror scanning, there is applied the disturbance vibration by the image forming apparatus or the like and therefore, it can be coped with by adopting feedback control taking robustness into account rather than by feed forward control.

That is, a feedback control system is constituted by the piezoelectric element 1 and the sensor 3, as shown in FIGS. 1A and 1B, whereby the vibrating state of each mirror is detected by the sensor 3, and the vibration frequency and the amount of amplitude of the bending mode of each mirror are calculated by the calculation part 9.

From the data thereof, a command for a feed back gain is given to the driving portion 11 so as to assume a predetermined amplitude value in the control part 10, and the optical mirrors are driven by the respective piezoelectric elements 1.

The mirrors given vibration by the piezoelectric elements 1 take such form that they have been given an opposite phase, as shown in FIG. 1C, and the closed loop calculation and operation are repeated until the totaled amplitude value is converged into its minimum state.

In this manner, each mirror has its bending vibration suppressed to the minimum in this manner, whereby the optical axis onto which the information of the original has been intensively concentrated can be sent onto the surface of the CCD 19 without being diffused on the surfaces of the mirrors and without any change in the length of the optical path.

(Second Embodiment)

FIGS. 4A, 4B, 5A and 5B show a second embodiment. This second embodiment is one in which the above-described optical system vibration controlling apparatus is applied to the optical system of an image forming apparatus.

That is, the optical system of this image forming apparatus is of a construction having a rotary polygon mirror 32 and an imaging lens system 33 for transmitting an optical image therefrom.

Figure 4A:
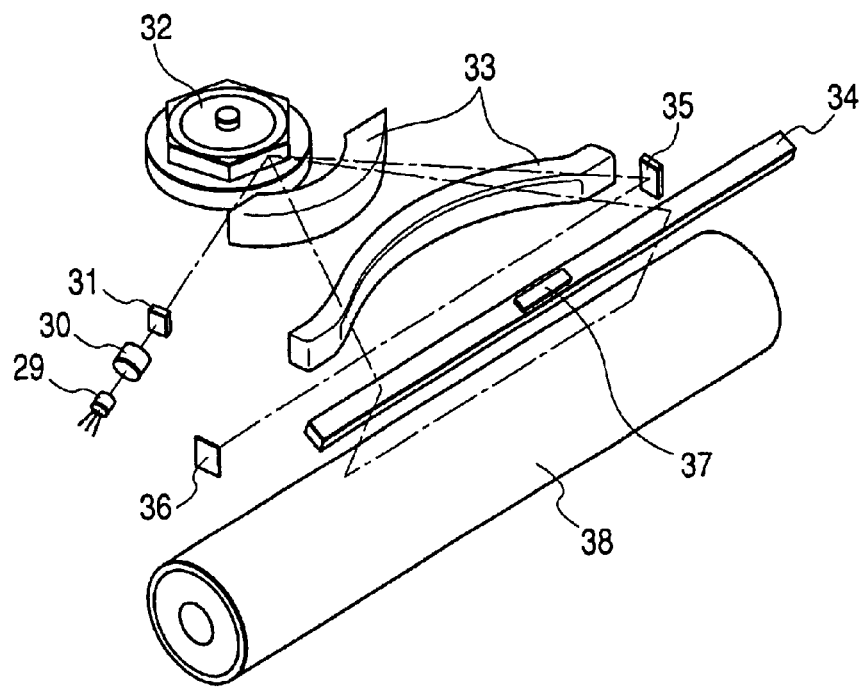
FIGS. 4A and 4B show an image forming apparatus to which the optical system vibration controlling apparatus of FIGS. 1A, 1B and 1C is applied, FIG. 4A being a perspective view, and FIG. 4B being a perspective view showing the relation thereof with an optical box.

That is, as shown in FIG. 4A, a laser beam applied from a semiconductor laser 29 will be diffused if it remains unchanged and therefore, it is changed into a cylindrical parallel beam by a collimator lens 30, and thereafter is further changed into a flat band-shaped parallel beam by a cylindrical lens 31, and is applied to the rotary polygon mirror 32.

The rotary polygon mirror is being rotated at as high a speed as the order of 30,000 rpm to 40,000 rpm with the higher speed of the apparatus, and the laser beam is applied to this rotary polygon mirror 32 and is reflected thereby, whereby the rotary polygon mirror comes to have a scanning property in a predetermined direction.

Thereafter, the laser beam enters the imaging lens system 33, and one end of this laser beam is reflected by a BD mirror 35 and this reflected light is taken out by a BD sensor 36, whereby the role of taking the synchronism of the starting point on the surface of a drum in the main scanning direction when the laser beam is written onto a photosensitive drum 38 is performed.

The laser beam which has entered the imaging lens system 33 and in which the information of the original has been intensively concentrated is turned back by a turnback mirror 34 and is applied to the surface of the photosensitive drum 38, whereby a latent image is formed thereof.

At this time, the turnback mirror 34 is driven by the vibration of a motor for the rotary polygon mirror 32 which is called a polygon mirror and disturbance vibration transmitted from other parts.

Figure 4B:
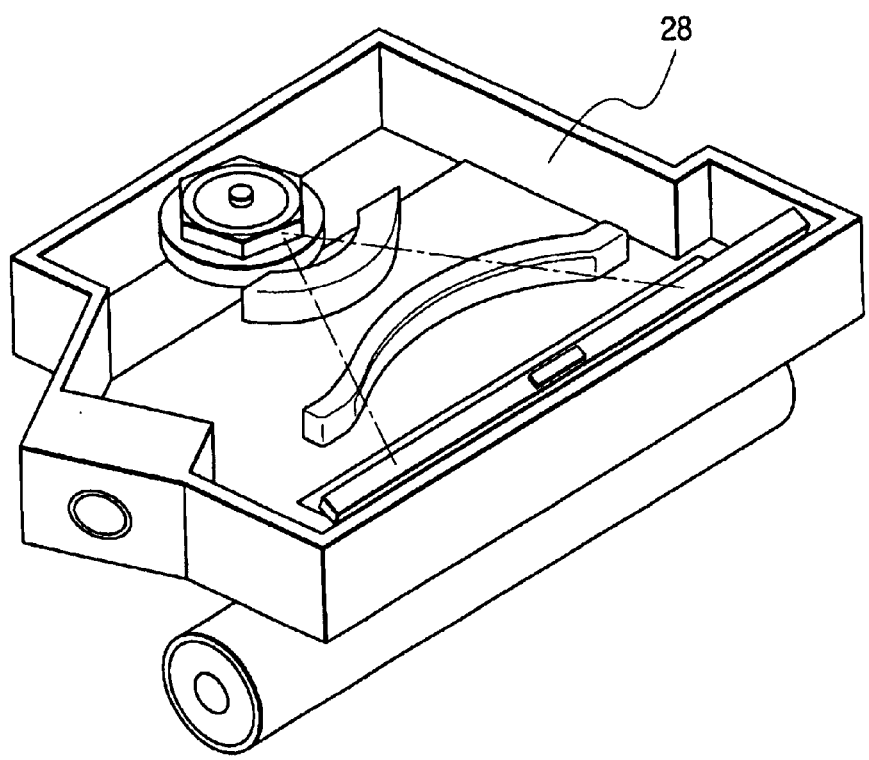
Figure 5A:
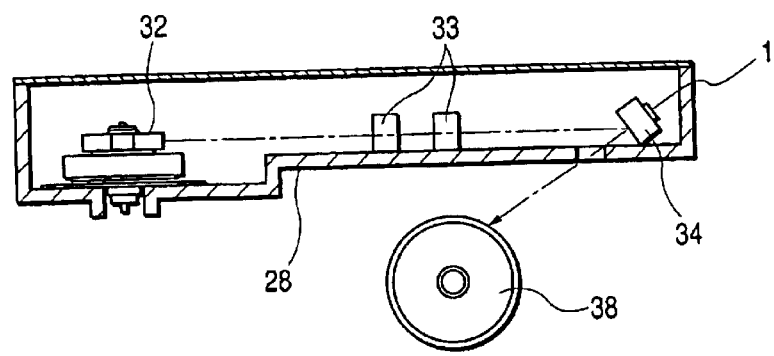
FIG. 5A is a cross-sectional view of the apparatus of FIGS. 4A, 4B, and 5B is an enlarged cross-sectional view of the fixed portion of the turnback mirror of FIG. 5A.
Figure 5B:
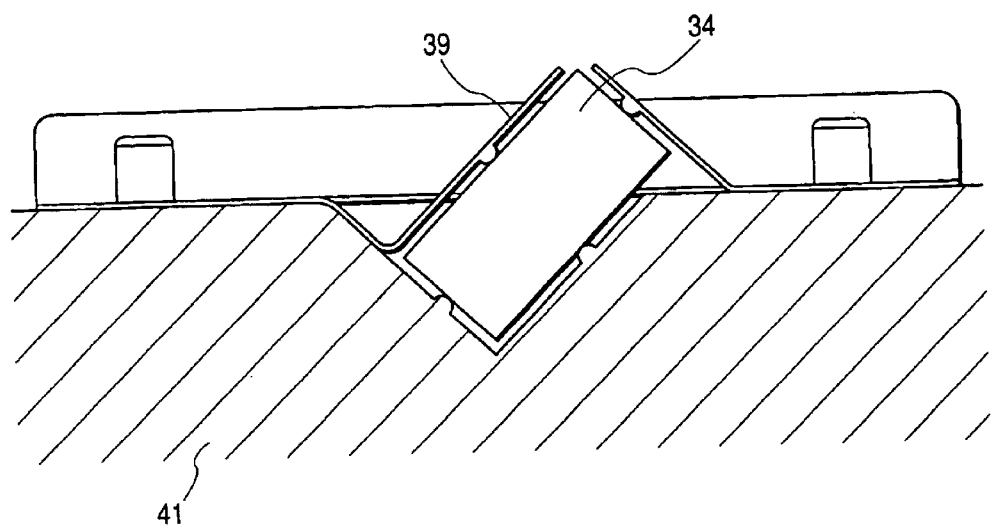
Figure 6A:
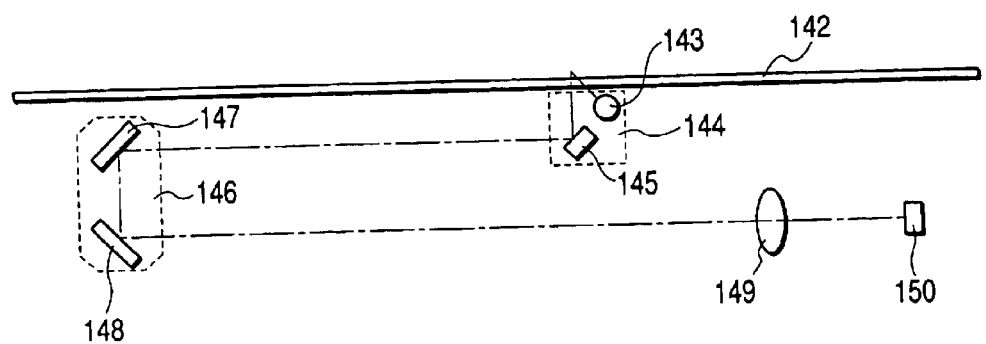
FIG. 6A shows a conventional example of an image reading apparatus.
Figure 6B:
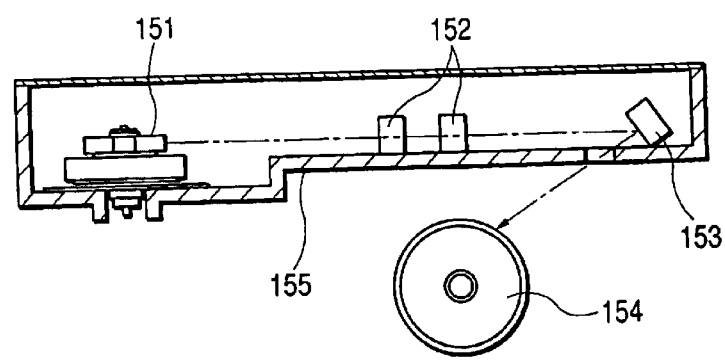
FIG. 6B shows a conventional example of an image forming apparatus.

The turnback mirror 34 is usually of a thin elongated shape because of the tendency of an optical box 28 shown in FIG. 4B toward a light-weight thin compact shape, and is an optical part which is very severe in the accuracy of the mirror surface and therefore, the installation thereof into the optical box 28 is usually done with the opposite ends thereof pressed against the turnback mirror holding portion of the main body 41 of the optical box by leaf springs 39, as shown in FIG. 5B.

Therefore, the turnback mirror 34 itself becomes liable to vibrate outwardly of the surface thereof with its opposite ends supported and therefore, this vibration is detected by the sensor 3 attached to the back of the mirror and the amplitude value thereof is calculated by the calculation part 9, and a feedback gain is given to the piezoelectric element 1 attached to the back of the mirror like the sensor so that the amount of vibration may become minimum in the control part 10.

It is desirable that the sensor 3 and the piezoelectric element 1 be attached and fixed to the mirror as in the embodiment in the optical scanning system.

The piezoelectric element 1 which has received a command gives vibration to the surface of the mirror in the form of returning an opposite phase to the mirror, and continues these series of operations until the amplitude value becomes minimum.

Thereafter, developing powder (toner) is electrostatically attracted to the surface of the photosensitive drum 38 by a developing process, not showing to thereby form an image of developing powder, which is then transferred to transferring paper, whereafter heat and pressure are applied thereto to thereby fuse the developing powder on the transferring paper.

While in the above-described embodiment, description has been made of a case where the piezoelectric element 1 is stuck on the turnback mirror 3 as an optical part, the piezoelectric element 1 can be stuck not only on the turnback mirror 34, but on the vibrated portion of the optical box to thereby suppress also the vibration of the optical box. Also, the optical part is not restricted to the turnback mirror 34, but the suppression of the vibration of any location in the vibrated portion of the optical system which affects the quality of image can be achieved.

As described above, according to the present invention, against a bad image caused by the vibration of an optical system which occurs frequently in the optical system of an image reading apparatus, an image forming apparatus or the like, there is provided a construction in which a piezoelectric element is closely fixed to the vibrated portion of the optical system and the vibration of the optical system is controlled by the vibration of the piezoelectric element and therefore, the vibration controlling effect can be obtained without any complicated mechanism portion and without spoiling mirror surface accuracy.

While the embodiments of the present invention has been described above, the present invention is not restricted to these embodiments, but all modifications within the scope of the invention are possible.

What is claimed is:

1. An image reader, comprising:
   a copy board part on which an original is placed;
   irradiating means for irradiating light onto an original placed on said copy board;
   a light receiving part for receiving reflection light reflected from the original;
   a moving mirror for moving relative to said copy board part and conducting the reflection light from the original to said light receiving part;
   detecting means for detecting a vibrating state of said moving mirror;
   vibrating means for applying vibration to said moving mirror; and
   control means for controlling the vibration applied by said vibrating means, on a basis of an output of said detecting means.

2. An image reader according to claim 1, wherein said control means controls the vibration so that the vibration of said moving mirror may become small.

3. An image reader according to claim 1, wherein said vibrating means includes a piezoelectric element.

4. An image reader according to claim 1, wherein said detecting means detects a frequency of the vibration of said moving mirror.

5. An image reader according to claim 1, wherein said detecting means detects an amplitude of vibration of said moving mirror.

6. An image reader according to claim 1, wherein said detecting means detects the vibrating state of said moving mirror in a form of an analog signal.

7. An image reader according to claim 3, wherein said piezoelectric element is attached and fixed to said moving mirror.

8. An image forming apparatus comprising:
   a photosensitive member for bearing an electrostatic image;
   a laser light source for generating laser light;
   a mirror for conducting the laser light generated by said laser light source onto said photosensitive member;
   scanning means for scanning the laser light conducted onto said photosensitive member by said mirror;
   detecting means for detecting a vibrating state of said mirror;
   vibrating means for applying vibration to said mirror;
   control means for controlling the vibration applied by said vibrating means, on a basis of an output of said detecting means; and
   developing means for developing the electrostatic image on said photosensitive member.

9. An image forming apparatus according to claim 8, wherein said control means controls the vibration so that the vibration of said mirror may become small.

10. An image forming apparatus according to claim 8, wherein said vibrating means includes a piezoelectric element.

11. An image forming apparatus according to claim 8, wherein said detecting means detects a frequency of the vibration of said mirror.

12. An image forming apparatus according to claim 8, wherein said detecting means detects an amplitude of vibration of said mirror.

13. An image forming apparatus according to claim 8, wherein said detecting means detects the vibrating state of said mirror in a form of an analog signal.

14. An image forming apparatus according to claim 10, wherein said piezoelectric element is attached and fixed to said mirror.

* * * * *

UNITED STATES PATENT AND TRADEMARK OFFICE
CERTIFICATE OF CORRECTION

PATENT NO. : 6,914,366 B2  
APPLICATION NO. : 10/231276  
DATED : July 5, 2005  
INVENTOR(S) : Kaga et al.

Page 1 of 1

It is certified that error appears in the above-identified patent and that said Letters Patent is hereby corrected as shown below:

COLUMN 1  
Line 29, "drum 1" should read --drum--.  
Line 57, "other" should read --another--.

COLUMN 3  
Line 37, "restric" should read --restrict--.

COLUMN 4  
Line 9, "made," should read --made of,--.  
Line 41, "he" should read --the--.  
Line 43, "he" should read --the--.

COLUMN 5  
Line 11, "factor" should read --factors--.

Signed and Sealed this

Fifteenth Day of August, 2006

JON W. DUDAS  
*Director of the United States Patent and Trademark Office*